O. O. BERGH.
ADJUSTABLE MIRROR HOLDER.
APPLICATION FILED MAY 8, 1911.
1,041,002.
Patented Oct. 15, 1912.
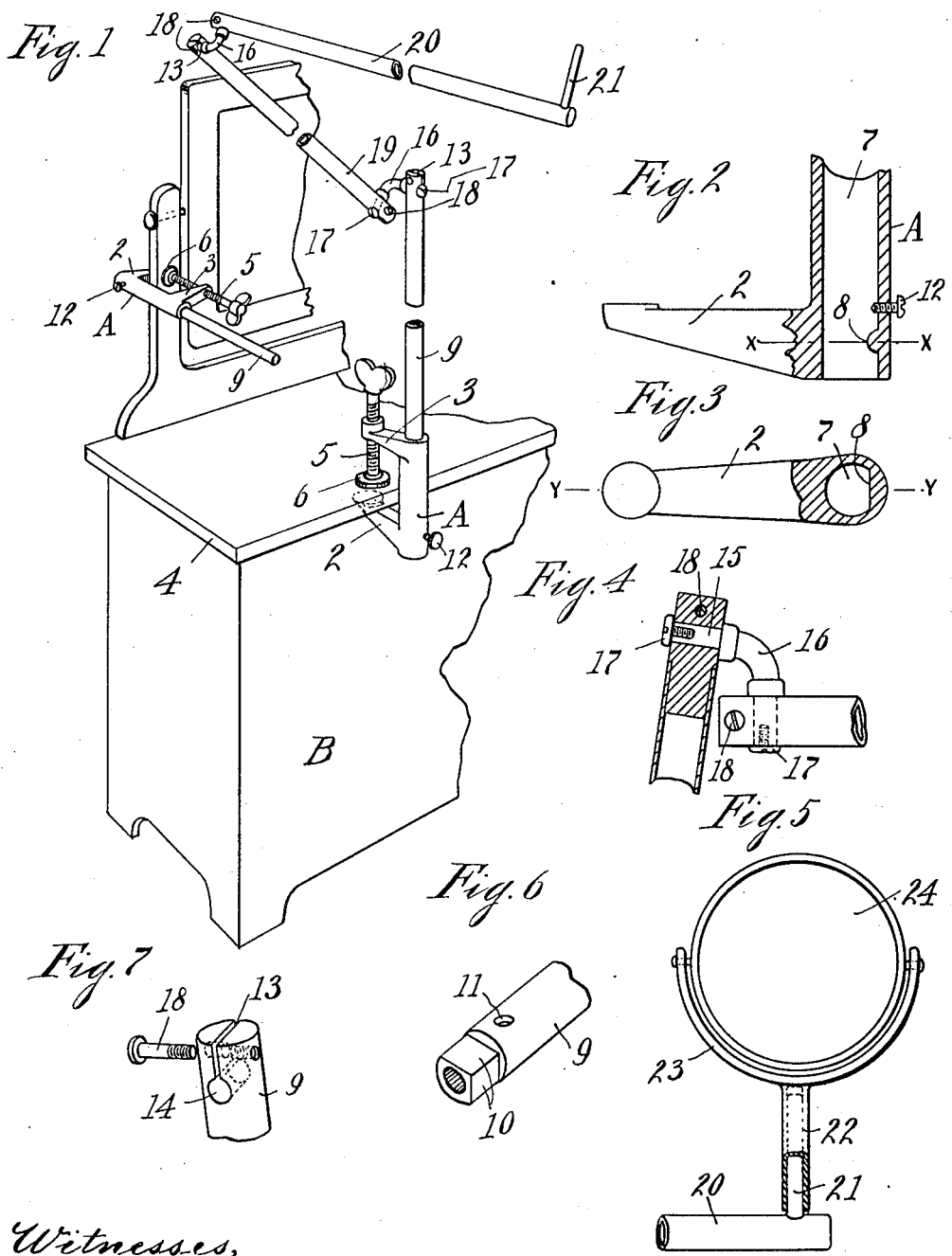
Witnesses,
George Voelker
H. Smith
Inventor,
Ole O. Bergh
by Lothrop Johnson
his Attorneys.

UNITED STATES PATENT OFFICE.

OLE O. BERGH, OF ST. PAUL, MINNESOTA.

ADJUSTABLE-MIRROR HOLDER.

1,041,002.　　　　Specification of Letters Patent.　　Patented Oct. 15, 1912.

Application filed May 8, 1911. Serial No. 625,835.

*To all whom it may concern:*

Be it known that I, OLE O. BERGH, a citizen of the United States, residing at St. Paul, in the county of Ramsey and State of Minnesota, have invented certain new and useful Improvements in Adjustable-Mirror Holders, of which the following is a specification.

My invention relates to improvements in adjustable mirrors designed particularly for attachment to a fixed support as the ledge of an article of furniture and consists particularly in providing means for securing universal adjustment of mirrors for convenience in shaving, etc.

To this end the invention consists in the features of construction, combination, and arrangement of parts hereinafter described and claimed.

In the accompanying drawings forming part of this specification, Figure 1 represents my improved mirror supporting mechanism arranged in connection with a bureau; Fig. 2 is a section of the attaching bracket on line $y$—$y$ of Fig. 3, shown partly in elevation; Fig. 3 is a section on line $x$—$x$ of Fig. 2; Fig. 4 is a partial section and elevation of an adjusting joint forming part of the mirror supporting mechanism; Fig. 5 is an elevation of the mirror and supporting bracket shown partly in section; Fig. 6 is a detail view of one end of a supporting standard forming part of my invention; and Fig. 7 is a detail view of the opposite end of the supporting standard.

Referring to the drawings A represents an attachment bracket formed with lateral arms 2 and 3 to stand upon opposite sides of the ledge 4 of an article of furniture with the end of the arm 2 bearing against one side of the ledge. A thumb screw 5 is threaded through the end of the arm 3 and carries at its threaded end a loose washer 6 to bear against the ledge in opposition to the end of the arm 2. The bracket A is formed with a longitudinal opening 7 with a flattened side 8, into which opening is adapted to fit one end of a standard 9. The said end of the standard 9 is formed with flattened side faces 10 to conform to the flattened face 8 of the opening 7 and is further formed with a screw opening 11 to receive the screw 12 threaded through the corresponding end of the standard. The opposite end of the standard is formed with a longitudinally extending slot 13 having a circular enlargement 14 at its inner end to receive the end 15 of a curved union 16. The end of the curved arm is secured in the opening 14 by means of a screw 17 threaded in the ends of said arm, with its head bearing against the side of the standard. The end of the standard is squeezed upon the union 16 by a screw 18. The opposite end of the union 16 is similarly secured in the adjacent end of an arm 19, which arm at its opposite end is similarly connected to one end of an arm 20, the free end of the arm 20 carrying a post 21. The post 21 fits into an opening in the standard 22 of a bracket 23, which bracket pivotally supports a suitable mirror 24.

It will be evident that the attachment bracket 8 may be secured upon the edge of any article of furniture as the horizontal or vertical ledge of a bureau B. When thus supported in position with the mirror supported upon the post 21 the mirror may be turned to any desired angle through the medium of the union 16. A plurality of cut-away faces 10 on the end of the standard 9 also allows the standard to be secured in differently turned positions in the attachment. A universal degree of adjustment is secured through the medium of the union, not obtainable in the ordinary constructions designed for this purpose, and the method of securing the union in the ends of the arms and standard allow convenient and effective adjusting pressure upon the unions to permit the arms with the supported mirror being held in adjusted positions.

I claim as my invention:

A device of the class described, comprising a plurality of relatively-movable supporting members the ends of which are split and provided with transverse openings therein, rigid union members interposed between adjacent ends of said relatively-movable members, said union members being curved to project their ends at right angles to each other, the ends of said union members fitting within the transverse openings of the supporting members, means for retaining the ends of the union members within said openings, and means for compressing the split ends of said supporting members to provide frictional engagement thereof with the union members.

In testimony whereof I affix my signature in presence of two witnesses.

OLE O. BERGH.

Witnesses:
H. S. JOHNSON,
H. SMITH.